April 30, 1968 E. F. KOVANIC 3,381,227

PULSE FREQUENCY DIVIDER USING DELAY LINE TIMING

Filed July 15, 1964 5 Sheets-Sheet 1

INVENTOR
E. F. KOVANIC
BY
ATTORNEY

United States Patent Office 3,381,227
Patented Apr. 30, 1968

3,381,227

PULSE FREQUENCY DIVIDER USING DELAY LINE TIMING

Edward F. Kovanic, Livingston, N.J., assignor to Bell Telephone Laboratories, Incorporated, New York, N.Y., a corporation of New York Filed July 15, 1964, Ser. No. 382,769
4 Claims. (Cl. 328—41)

This invention relates to pulse frequency dividers of the type having a delay line, the effective length of which may be changed by a change-count signal to change the number of input pulses counted for each output pulse.

Whenever pulses recur at extremely high rates, as in nuclear reactors, monitoring instruments and controls are supplied with pulses through pulse frequency dividers responsive to the recurring pulses. The ratios of input pulse frequency to output pulse frequency of these dividers are quite high and may, for example, exceed 1000. At such high ratios, dividers using ordinary chains of multivibrators become wasteful of circuitry, and it becomes desirable to determine the ratio by the length of a delay line through which an output pulse is fed back to gate another pulse to the output.

Frequently, during the course of operation, it may become desirable to change the divider ratio substantially. In nuclear reactor installations, for example, it may be desired to supply temporarily an auxiliary monitoring instrument having characteristics differing from those of the primary monitoring instrument.

A similar problem may soon arise in pulse code modulation (PCM) communication systems, in which a pulse frequency divider having a ratio equal to the number of channels multiplexed is useful. Delay line type dividers will become necessary as the pulse repetition rates and the number of channels multiplexed on one communication facility are increased. In this case, the ratio must be changed periodically to permit insertion of pulses to check the accuracy of transmission, a process that is similar to the insertion of an additional channel in the multiplexing routine. Although the change of ratio should be periodic, frequently the leading edge of the pulse that effects the change in ratio is so distorted that the pulse frequency divider must be designed so that it can smoothly change its ratio even if that pulse arrives at a random time.

Applicant has observed that there are no previously known delay line type pulse frequency dividers that will permit randomly timed conversion from one pulse frequency ratio to another, particularly if the two ratios differ by more than one unit. Applicant has recognized that in some combinations of circumstances, a plurality of pulses may propagate simultaneously in the delay line and produce an erratic variation in the ratio of the output pulse frequency to input pulse frequency.

The object of the invention is to provide randomly timed conversion from one input-output pulse frequency ratio to another ratio that differs from the first in a pulse frequency divider that is gated by feedback through a delay line.

A further object of the invention is to provide stable operation in a pulse frequency divider having a delay line variable in total delay, whereby an erratic variation in input-output frequency ratio is prevented.

According to the invention, a signal to change the ratio of a variable delay line type of pulse frequency divider is applied to inhibit passage of pulses into the delay line whenever there is at least one pulse in the effective length thereof and is applied to enable passage of pulses into the delay line whenever there are no pulses in the effective length thereof.

More specifically, a signal to increase the ratio is differentiated and is applied to drive a monostable multivibrator to inhibit an effective output of the lengthened delay line for a period equal to the added amount of delay. All pulses, except one, then propagating in the delay line are rendered ineffective. A signal to decrease the ratio is differentiated and is applied to a bistable multivibrator to enable an effective output of the removed portion of the delay line until the shortened delay line itself has an output. This arrangement guards against the possibility, arising from random timing of the signal to decrease the ratio, that no pulses may be propagating in the shortened dalay line. In this case, the divider is permitted to finish a cycle at the higher ratio of input-to-output frequency.

Other features and advantages of the invention will become apparent from the following detailed description and the drawings, in which.

Figure 1:
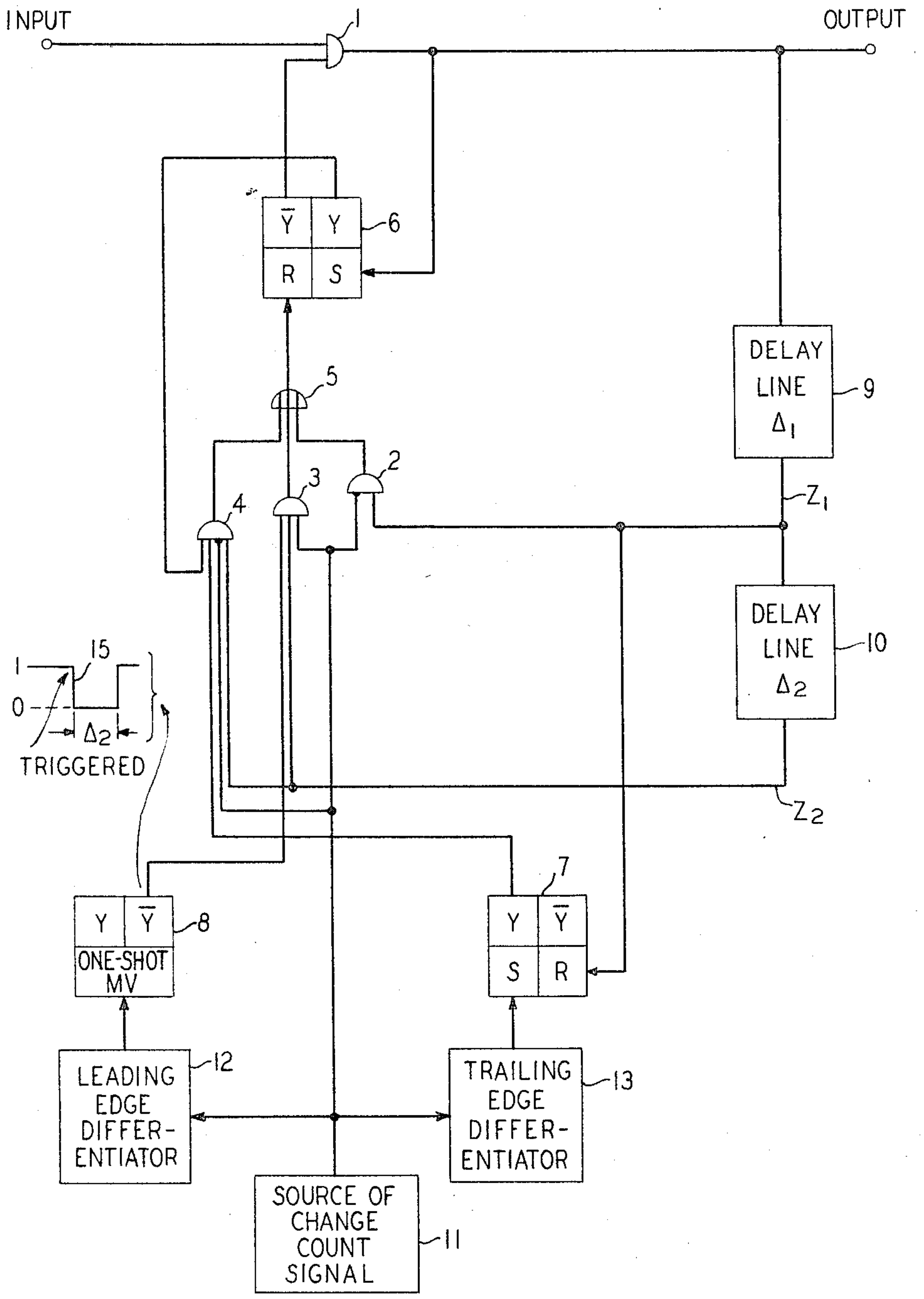
FIG. 1 is a block diagrammatic illustration of a preferred embodiment of the invention.

In the pulse frequency divider of FIG. 1, the pulses to be applied to the input may be derived from any desired source, such as a radiation detector or a clock pulse source. The divider is used to best advantage when the source has a repetition rate of the order of ten megacycles per second ($10^7$c.p.s.). It is understood that, in this frequency range, any of the circuit connections indicated in FIG. 1 are best made by coaxial transmission line unless they are physically very short.

The pulses obtained at the output are available for use in monitoring or control circuitry, even though this circuitry may be able to respond only to relatively low pulse repetition rates.

The input of the pulse frequency divider is one input of an AND gate 1; and the output of the pulse frequency divider is the output of AND gate 1.

Flip-flop 6 is a bistable multivibrator having its "set" input connected to the output of AND gate 1 and its "reset" input connected to the output of OR gate 5. The $\overline{Y}$ output of flip-flop 6 is connected to the second input of AND gate 1.

The input of a coaxial delay line section 9 is connected to the output of AND gate 1; and the output of delay line section 9 is connected to the input of a delay line section 10 and to one input of an AND gate 2. The output of delay line section 10 is connected to an input of an AND gate 3 and to an input of an AND gate 4; and the outputs of AND gates 2, 3 and 4 are connected to the inputs of OR gate 5.

For illustrative purposes, change-count signal source 11 may be a source of voltage and a push-button switch connected serially between the voltage source and the output of source 11. Such a push-button switch may be randomly controlled by a human operator. The output of source 11 is connected to the inhibit inputs of AND gates 2 and 4 and to a second input of AND gate 3. In addition, the output of source 11 is connected to the inputs of a pair of differentiator circuits shown as leading edge differentiator 12 and trailing edge differentiator 13. According to one feature of the invention, the output of leading edge differentiator 12 is applied to the trigger input of a one-shot or monostable multivibrator 8; and the $\overline{Y}$ output of monostable multivibrator 8 is applied to the third input of AND gate 3. As indicated in the curve 15 adjacent thereto, multivibrator 8 has the characteristic that, following application of a pulse to the trigger input, effective signal voltage is removed from the $\overline{Y}$ output for a period equal to the delay of delay line section 10.

According to another feature of the invention, the output of trailing edge differentiator 13 is connected to the "set" input of a flip-flop 7, which is a bistable multivibrator. Further, the reset input of flip-flop 7 is connected to the output of delay line section 9; and the Y output of flip-flop 7 is connected to a third input of AND gate 4. The fourth input of AND gate 4 is connected to the Y output of flip-flop 6.

The structural details of the multivibrators, gates and delay line will be more specifically described hereinafter with reference to FIG. 4.

Figure 2:
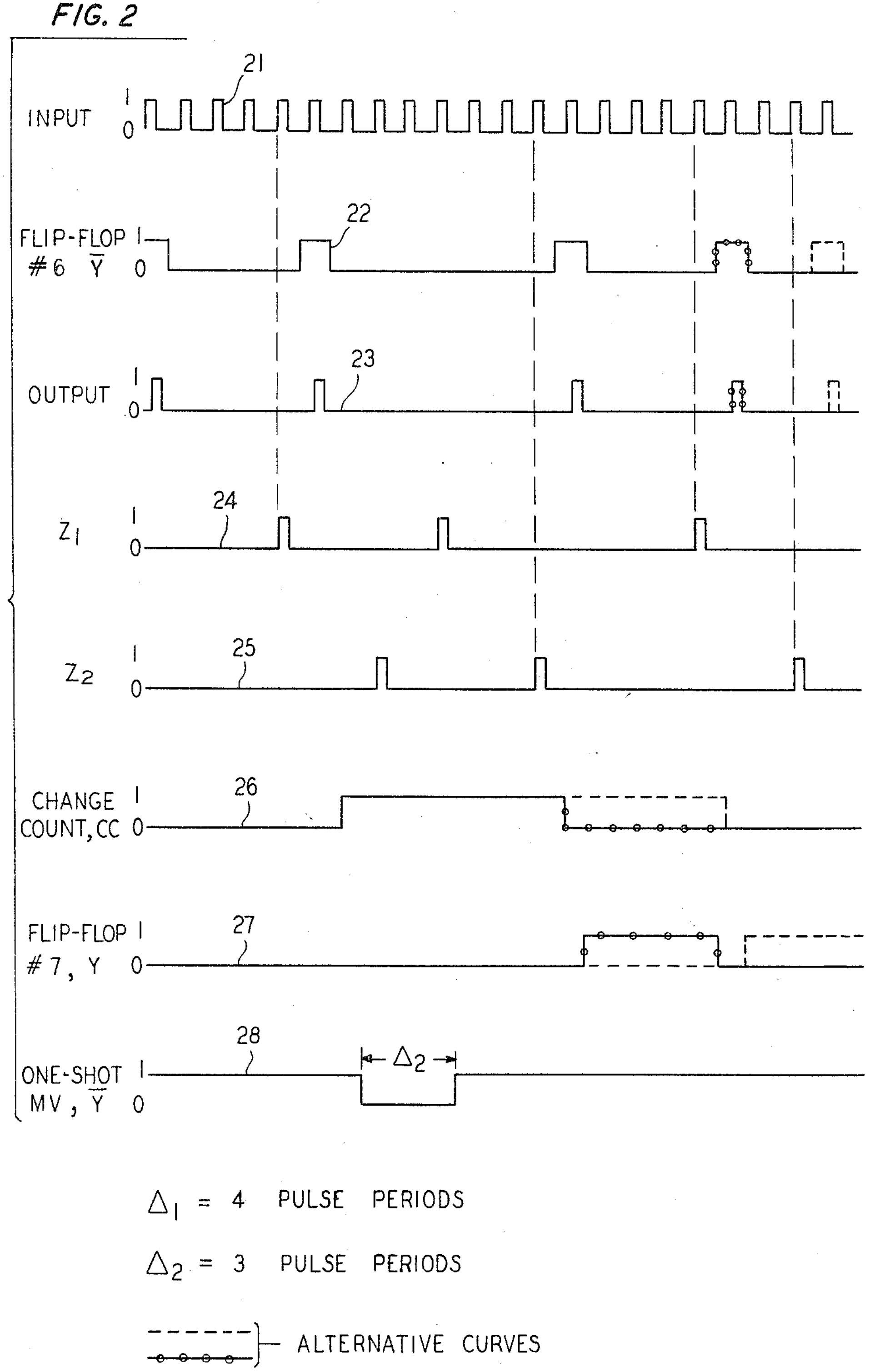
FIGS. 2 and 3 show curves that are helpful in explaining the theory and operation of the embodiment of FIG. 1.

In operation, input pulses such as those shown in curve 21 of FIG. 2 are applied to the input of the divider at the first input of AND gate 1. It is understood that these pulses should be nearly evenly spaced. They can appear at the output of gate 1 only when flip-flop 6 is in its reset state, that is, when the $\overline{Y}$ output of flip-flop 6 applies an effective signal to the second input of AND gate 1. Flip-flop 6 should commence operation in its reset state when the circuit is energized, as indicated in curve 22 of FIG. 2. This initial condition may be achieved as explained hereinafter with reference to the circuit of FIG. 4.

The first input pulse will thus be gated to the output, as shown in curve 23 of FIG. 2, and will enter delay line section 9. The output pulse also is applied to the set input of flip-flop 6, removing the effective signal from the $\overline{Y}$ output and providing a corresponding effective signal that appears at the Y output after a time lag that is greater than the width of the input pulses, as shown in curve 22.

In practice, the delay $\Delta_1$, of section 9 would be tens or hundreds of integral pulse periods, since the invention has its greatest advantage for applications in which a high ratio of input pulse frequency to output pulse frequency is desired. However, for the sake of clarity of drawing and explanation, FIG. 2 illustrates delay $\Delta_1$ equal to four pulse periods and delay $\Delta_2$ equal to three pulse periods. After $\Delta_1$ pulse periods a pulse $Z_1$ (curve 24 of FIG. 2) issues from delay line section 9 and is applied to the first input of AND gate 2. Since change-count source 11 has no effective signal at this time, as indicated in curve 26 of FIG. 2, AND gate 2 is not inhibited; and the output pulse of section 9 is gated through AND gate 2, then through OR gate 5 to the reset input of flip-flop 6. Flip-flop 6 responds to the $Z_1$ pulse from section 9 after a time lag as shown by curves 24 and 22 of FIG. 2.

Thus, the input pulse next following reset of flip-flop 6 is gated to the output; and the input-to-output pulse frequency ratio is $\Delta_1+1$, or 5 for the example shown.

The object of the invention regarding change in division ratio requires that delay line section 10 be added to section 9 at a random time in such a way that the input-to-output pulse frequency ratio transfers smoothly from 5 to 8, that is, to $\Delta_1+\Delta_2+1$.

Assume that change-count signal source 11 produces an effective output signal between the time that a given pulse issues from section 9 and the time that the same pulse issues from section 10, as shown in curve 26 of FIG. 2.

This change-count signal, which is essentially an order to utilize delay section 10 in addition to section 9, is applied to inhibit AND gate 2 and to prepare AND gate 3 for the passage of a $Z_2$ pulse (curve 25, FIG. 2). However, the counting ratio would be severely upset if the next subsequent $Z_2$ pulse were gated through AND gate 3, as may be appreciated from an examination of curves 25 and 23 in FIG. 2.

According to a feature of the invention, the change-count signal 11 is applied to trigger monostable multivibrator 8, which in turn inhibits gate 3 for a period equal to the delay of delay line section 10, as shown in curve 28 of FIG. 2. Since the leading edge of the change-count signal may be irregular, leading edge differentiator 12 provides a sharp trigger pulse in response to the first pronounced upward slope of the signal. It may readily be seen that, when multivibrator 8 reacquires its normally effective $\overline{Y}$ output signal after $\Delta_2$ pulse periods, there is only one pulse propagating in delay line section 10. This pulse, the second one shown in curve 25, will pass AND gate 3 and OR gate 5, and reset flip-flop 6. The next subsequent input pulse will pass through AND gate 1 to the output. It will be observed that the divider has produced 1 output pulse for the last 8 input pulses, and that the transition from a ratio of 5 to a ratio of 8 has been smooth. Moreover, a smooth transition will obviously occur for any position of the leading edge of the change-count signal. The most troublesome case has just been described, that is, the case in which a plurality of pulses are propagating in delay line section 10.

It will now be shown that a smooth transition of the frequency ratio from $\Delta_1+\Delta_2+1$ to $\Delta_1+1$ is achieved when the change-count signal is removed.

If the trailing edge of the change-count signal 11 occurs between the time a $Z_2$ pulse is gated to the reset input of flip-flop 6 and the time that the next $Z_1$ pulse appears, there is no problem, since AND gate 2 will be enabled in time to pass that $Z_1$ pulse. For this case, an alternate portion of curve 26 is shown marked with small circles. The corresponding $\overline{Y}$ output signal of flip-flop 6 and the corresponding output pulse of AND gate 1 are similarly marked with small circles in curves 22 and 23, respectively.

A problem arises if the trailing edge of the change-count signal occurs between the time that a $Z_1$ pulse issues from delay line section 9 and the time that a $Z_2$ pulse issues from delay line secion 10, as shown by the dotted alternate portion of curve 26. The $Z_1$ pulse does not reset flip-flop 6 because AND gate 2 is still inhibited during the time it exists at the output of delay line section 9; and the $Z_2$ pulse cannot pass through gate 3, which is inhibited by the absence of the change-count signal 11 during the time that the $Z_2$ pulse exists at the output of delay line section 10.

According to another feature of the invention, the trailing edge of the change-count signal, i.e., a signal to decrease the input-output frequency ratio, enables AND gate 4 until a subsequent pulse issues from delay line section 9, that is, from the effectively shortened delay line. Specifically, even if the trailing edge is irregular, trailing edge differentiator 13 triggers the set input of bistable multivibrator 7 in response to the most steeply sloping portion of the trailing edge to enable AND gate 4. Thus, if the only pulse propagating in the entire delay line is in the section 10, that last pulse is still effective to reset flip-flop 6, in spite of the disappearance of the change-count signal, as shown by the dotted portions of curves 22 and 23. However, if a $Z_1$ pulse resets flip-flop 7 before that $Z_2$ pulse appears, as illustrated by the curve portions marked with small circles, then that $Z_2$ is not effective to reset flip-flop 6.

Figure 3:
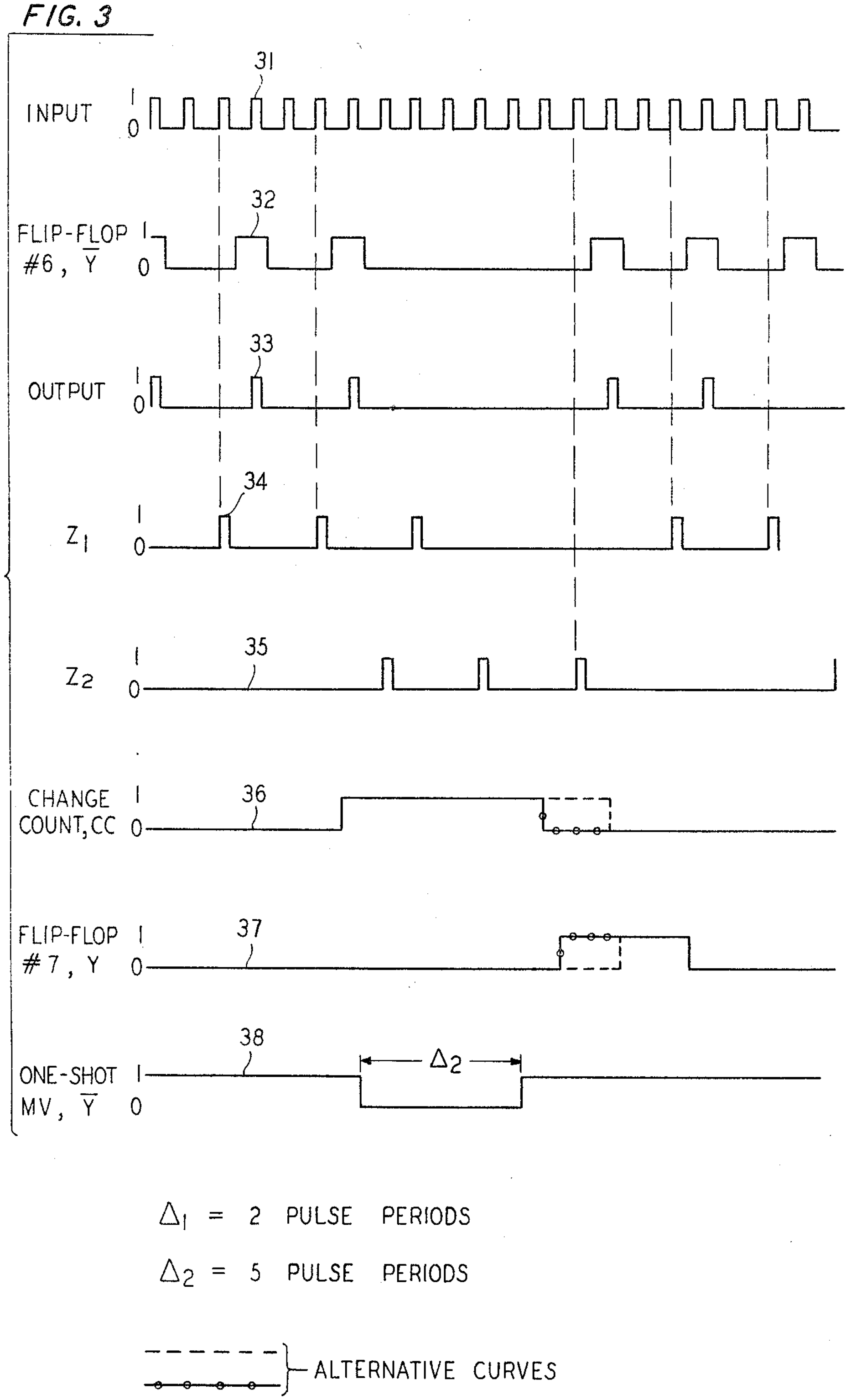

The embodiment of FIG. 1 also works when $\Delta_2$ is greater than $\Delta_1$. In FIG. 3, the case for $\Delta_1$ equal to 2 pulse periods and $\Delta_2$ equal to 5 pulse periods is illustrated. The leading edge of a change-count signal triggers monostable multivibrator 8, which in turn inhibits AND gate 3 for 5 pulse periods so that only the last pulse propagating in added delay line section 10 may be effective to reset flip-flop 6 as shown by curves 38, 35, and 32 in FIG. 3. A change of the input-output frequency ratio from 3 to 8 is thereby achieved. If the change-count signal is removed before that last pulse issues from delay line section 10, as illustrated by the alternate portion of curve 36 marked with small circles, then the trailing edge triggers bistable multivibrator 7 to enable gate 4.

In the special case in which $\Delta_2$ is equal to 1, if a change count signal is prematurely terminated, AND gate 4 needs to be enabled for only one pulse period. Therefore, monostable multivibrator 8 can be used in place of bistable multivibrator 7, which can then be removed.

Specifically, the modification would involve removing flip-flop 7, connecting the output of leading edge differentiator 12 and the output of trailing edge differentiator 13 through an OR gate to the trigger input of one-shot multivibrator 8, and connecting the Y output of monostable multivibrator 8 to the input of AND gate 4 to which the Y output of flip-flop 7 is shown connected. The Y output of one-shot multivibrator 8 would remain connected as shown.

Figure 4A:
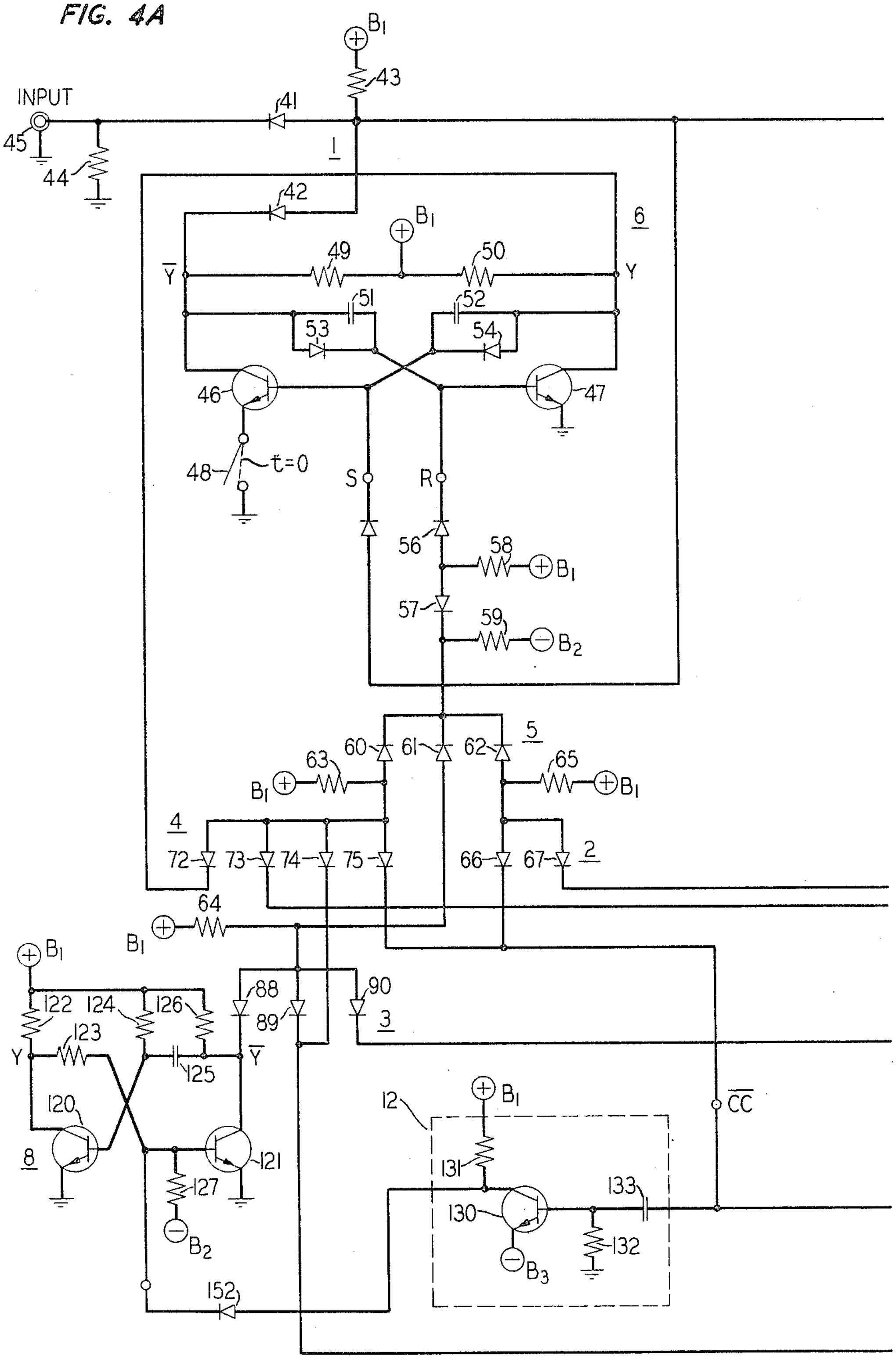
FIGS. 4A and 4B are detailed schematic circuit diagrams of the embodiment of FIG. 1.
Figure 4B:
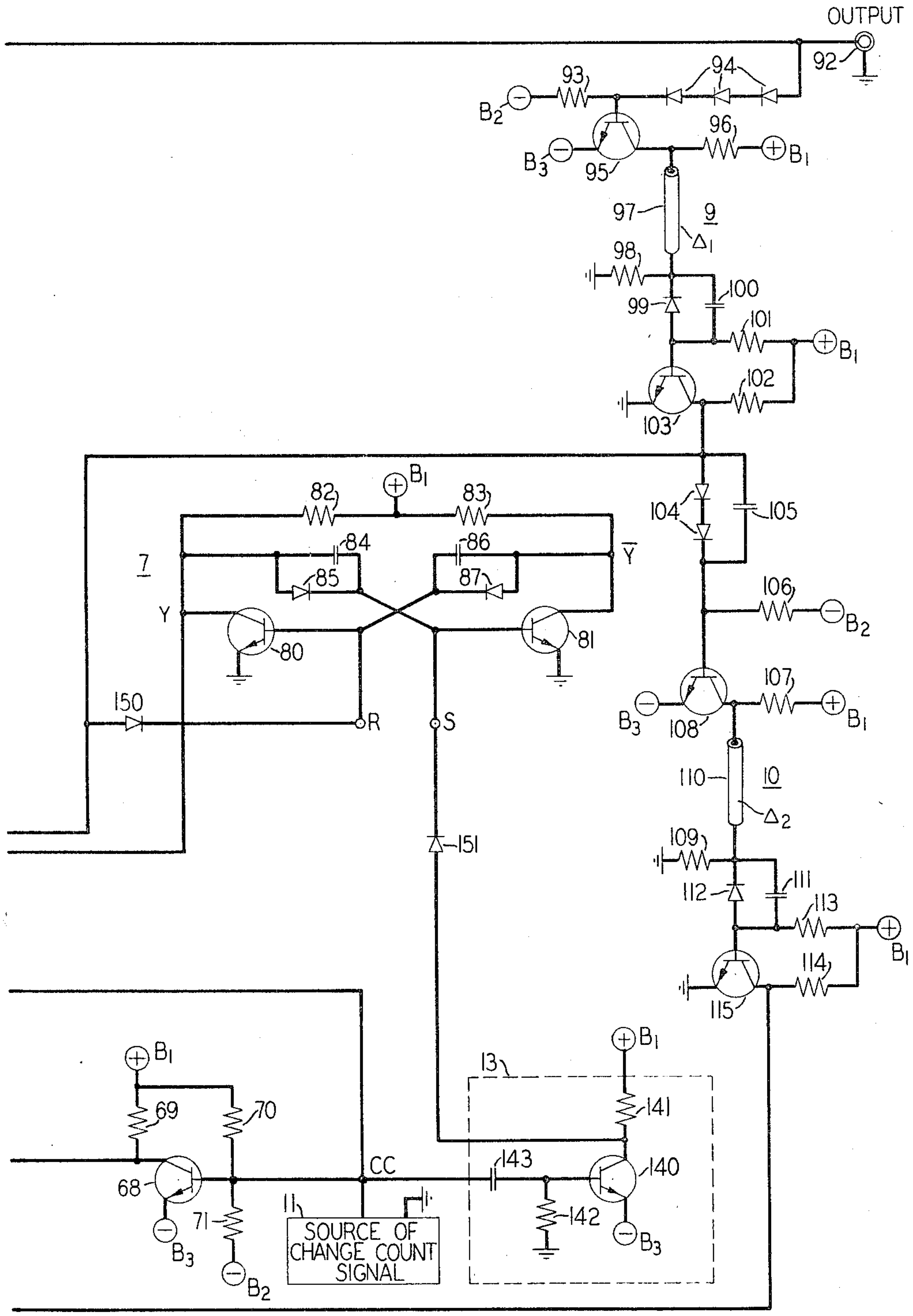

FIG. 4 shows preferred transistor circuitry that may be used to implement the embodiment of FIG. 1. The schematic circuits of the various elements of the block diagram are shown in detail. The underlined reference numerals in FIG. 4 denote the same elements as the corresponding numerals in FIG. 1.

Thus gate 1 comprises diodes 41 and 42 having their anodes connected together to the output, and their cathodes connected respectively to the divider input supplied through coaxial line 45 and to the $\overline{Y}$ output of flip-flop 6. They are biased in the usual manner through resistor 43 and positive voltage supply $B_1$.

Flip-flop 6 comprises transistors 46 and 47, the collector electrodes of which are respectively the $\overline{Y}$ and Y outputs of flip-flop 6. An effective $\overline{Y}$ output exists when transistor 46 is not conducting and transistor 47 is conducting. Since OR gate 5 passes positive voltage pulses, the base of NPN transistor 46 is the set input and the base of NPN transistor 47 is the reset input.

A switch 48 is connected from the emitter of transistor 46 to ground and is closed after power is supplied to the circuit so that transistor 47 will be initially conducting and transistor 46 will be initially nonconducting, i.e., a $\overline{Y}$ output will be present.

Further, in flip-flop 6, collector resistors 49 and 50 are connected from the $B_1$ (positive) supply to the collectors of transistors 46 and 47, respectively. Cross-coupling diode 53 has its anode connected to the collector of transistor 46 and its cathode connected to the base of transistor 47. Cross-coupling diode 54 has its anode connected to the collector of transistor 47 and its cathode connected to the base of transistor 46. Capacitors 51 and 52 are connected in parallel with diodes 53 and 54, respectively. The emitter of transistor 47 is connected to ground.

In OR gate 5, the cathode of diode 56 is connected to the base of transistor 47 and its anode is connected to the anode of diode 57. The cathode of diode 57 is connected to the cathodes of diodes 60, 61 and 62, the anodes of which are the inputs of the OR gate 5. Resistor 58 is connected from the anodes of diodes 56 and 57 to the positive $B_1$ supply; and resistor 59 is connected from the cathode of diode 57 to the $B_2$ (negative) supply. These biasing connections maintain the anode potential of diode 56 positive, but slightly lower than the combined conduction thresholds of diode 56 and the base-emitter junction of transistor 47.

In AND gate 2, the anodes of diodes 66 and 67 are connected together to comprise the output, which is connected to the anode of diode 62 in OR gate 5. Resistor 65 is connected from the anodes of diodes 66 and 67 to the positive $B_1$ supply. It is noted that only one of diodes 66 and 67 needs to conduct to clamp the input voltage to diode 62 in OR gate 5 at a level too low to trigger transistor 47. The cathodes of diodes 66 and 67 comprise the inputs of AND gate 2, and are connected to the collectors of transistors 68 and 103, in circuitry to be described hereinafter.

In AND gate 4, the anodes of diodes 72 through 75 are connected together to the output, thence to the anode of diode 60 in OR gate 5. Resistor 63 is connected from the anodes of diodes 72 through 75 to the positive $B_1$ supply. It is noted that only one of diodes 72 through 75 needs to conduct to clamp the input voltage to diode 60 at a level too low to trigger transistor 47. The cathodes of diodes 72 through 75 comprise the inputs of AND gate 4, and are connected to the collector of transistor 47 in flip-flop 6, described above, to the collector of transistor 80 in flip-flop 7, to the collector of transistor 115 at the output of delay line section 10, and the collector of transistor 68, respectively. The latter three circuits will be described hereinafter.

In AND gate 3 the anodes of diodes 88 through 90 are connected together as the output, thence to the anode of diode 61 in OR gate 5. Resistor 64 is connected from the anodes of diodes 88 through 90 to the positive $B_1$ supply. It is noted that only one of diodes 88 through 90 needs to conduct to clamp the input voltage to diode 61 at a level too low to trigger transistor 47. The cathodes of diodes 88 through 90 comprise the inputs of AND gate 3, and are connected to the collector of transistor 121 in monostable multivibrator 8, to the collector of transistor 115 at the output of delay line section 10, and to the source 11 of the change-count signal.

Delay line section 9 comprises coaxial delay line element 97 of conventional type, an input pulse amplifier including transistor 95 and associated components 93 through 96 arranged in conventional manner, and an output pulse amplifier including transistor 103 and associated components 98 through 102 arranged in a conventional manner. Diodes 94 couple the outgoing coaxial transmission line 92 to the base electrode of transistor 95. It will be noted that the divider output pulses are positive in sense, while the pulses injected into coaxial delay line element 97 are negative in sense. The sense is again reversed at the collector of transistor 103. Thus, transistor 103 is normally conducting in the absence of a pulse at its base electrode and the voltage drop from its collector to emitter is less than the base-emitter junction threshold of transistor 47. Silicon transistors of the epitaxial type were used to achieve this characteristic, which is utilized throughout the circuit of FIG. 4. These transistors also provide low carrier storage and high frequency switching response.

Delay line section 10 comprises coaxial delay line element 110, an input pulse amplifier including transistor 108 and associated components 104 through 107 arranged in a conventional manner, and an output pulse amplifier including transistor 115 and associated components 109 and 111 through 114 arranged in a conventional manner. The pulses that propagate in coaxial delay line element 110 are negative in sense, but are converted again to a positive sense at the collector electrode of transistor 115. That is, transistor 115 is normally conducting and is cut off by a negative pulse from delay line element 110.

It is noted that delay elements 97 and 110 could also be one-shot multivibrators having pulse widths equal to the needed delays. They would be followed by differentiating circuits to derive pulses from the trailing edges of the multivibrator output pulses.

Bistable multivibrator 7 comprises transistors 80 and 81 and associated components 82 through 87 in an arrangement substantially similar to that of bistable multivibrator 6. The base electrode of transistor 80 is connected to the cathode of isolating diode 150, the anode of diode 150 being connected to the collector of transistor 103 at the output of delay line section 9; and the base electrode of transistor 81 is connected to the cathode of isolating diode 151, the anode of diode 151 being connected to the collector electrode of transistor 140 in trailing edge differentiator 13.

Monostable multivibrator 8 comprises transistors 120 and 121. The emitters of transistors 120 and 121 are grounded. Resistors 122 and 126 are connected from respective collector electrodes of transistors 120 and 121 to positive potential supply $B_1$. Cross-coupling resistor 123 and cross-coupling capacitor 125 are connected from the respective collector electrodes of transistors 120 and 121 to base electrode of the other transistor. Resistor 124 is connected from the positive supply $B_1$ to the base electrode of transistor 120; and resistor 127 is connected from the negative supply $B_2$ to the base of transistor 121. The collector electrode of transistor 121 is the $\overline{Y}$ output of multivibrator 8 and is connected to the cathode of diode 88 in AND gate 3. The base electrode of transistor 121 is the trigger input of monostable multivibrator 8, and is connected to the cathode of isolating diode 152, the anode of diode 152 being connected to the collector of transistor 131 in leading edge differentiator 12.

Leading edge differentiator 12 comprises transistor 130 having its emitter electrode connected to negative supply $B_3$, its collector electrode connected through load resistor 131 to positive supply $B_1$ and its base electrode connected to a differentiating circuit comprising capacitor 133 and resistor 132. Capacitor 133 is connected between the base electrode of transistor 130 and the collector electrode of transistor 68. Resistor 132 is connected between the base electrode of transistor 130 and ground. The RC product for capacitor 133 and resistor 132 is an order of magnitude smaller than the time width of input pulses from coaxial line 45.

Transistor 68 and associated components 69 through 71 comprise a conventional inverter amplifier stage. A positive-going voltage applied to the base electrode of transistor 68 by change-count signal source 11 will drive the collector electrode of transistor 68 in a negative sense. The current through capacitor 133 is substantially proportional to the rate of change of voltage at the collector electrode of transistor 68, since the impedance of capacitor 133 is much larger in magnitude than the resistance of resistor 132. The voltage across resistor 132 is also substantially proportional to the rate of change of voltage at the collector of transistor 68. Transistor 130 amplifies this derivative signal in order to trigger transistor 121 on the first relatively steep portion of the leading edge of the change-count signal. It is noted that circuit 12 is not sensitive to the trailing edge of a change-count signal, since transistor 130 is already saturated.

Trailing edge differentiator 13 comprises transistor 140 and associated components 141 through 143 in an arrangement substantially similar to that of leading edge differentiator 12, except capacitor 143 is connected directly to the ungrounded terminal of change-count signal source 11, and the collector electrode of transistor 140 is connected to the base of transistor 81 in bistable multivibrator 7. Transistor 140 is cut off on the first relatively steep portion of the trailing edge of the change-count signal. Trailing edge differentiating circuit 13 is not sensitive to the leading edge of a change-count signal because transistor 140 is already saturated at that time.

The operation of the circuit of FIG. 4 is substantially the same as that explained above for the circuit of FIG. 1. It may be noted that the inhibit connections indicated for AND gates 2 and 4 in FIG. 1 are equivalently supplied by connections to the collector electrode of inverter amplifier transistor 68.

In an embodiment, the voltages of the supplies were representatively as follows:

| | Volts |
|---|---|
| $B_1$ | +6 |
| $B_2$ | −6 |
| $B_3$ | −1.5 |

$B_2$ is greater in magnitude than $B_3$. All circuit resistors are proportioned in a conventional manner, except as otherwise specified.

It is apparent that one modification of the embodiment of FIG. 1 would involve the use of a gate between delay line section 9 and delay line section 10 to admit pulses to section 10 only after a change-count signal is supplied by source 11. Monostable multivibrator 8, leading edge differentiator 12 and the indicated inhibit input of AND gate 3 would then become unnecessary.

In any case, multivibrator 6 can be reset by only one pulse that is propagating in delay line sections 9 and 10 at any instant of time.

Another possible modification of the arrangement of FIG. 1 involves obtaining the reset signal for bistable multivibrator 7 from the output of AND gate 1 instead of from the output of delay line section 9.

What is claimed is:

1. A pulse frequency divider comprising an input, an output, first means for gating pulses from said input to said output, a first bistable multivibrator arranged to be set by a pulse at said output and to be reset by a reset signal, said first bistable multivibrator enabling said first gating means whenever reset, first and second delay line sections connected serially to said output, a source of signal to utilize both of said delay line sections, second means for gating pulses from said first delay line section as said reset signal whenever said utilization signal is absent, third means for gating signals from said second delay line section as said reset signal whenever said utilization signal has been present longer than the inherent delay of said second delay line section, and fourth means for gating signals from said second delay line section as said reset signal during the period from the removal of said utilization signal until a subsequent pulse emerges from said first delay line section.

2. A pulse frequency divider according to claim 1 in which the fourth gating means includes a second bistable multivibrator arranged to be set by the removal of the utilization signal and to be reset by a pulse from the first delay line section, and a diode gate arranged and adapted to be responsive to set conditions of said first and second bistable multivibrators, said utilization signal and pulses from the second delay line section, said second bistable multivibrator inhibiting said diode gate whenever reset.

3. A pulse frequency divider according to claim 1 in which the third gating means includes a second diode gate having first, second and third inputs and a monostable multivibrator having an output connected to said first input of said second diode gate, said monostable multivibrator having an input responsive to the appearance of the utilization signal to inhibit said second diode gate after the appearance of said utilization signal for a time period equal to the inherent delay of the second delay line section.

4. A pulse frequency divider having a first AND gate with first and second inputs and an output, said first input being the input of said divider and said output being the output of said divider, a first bistable multivibrator having a first input connected to said output of said first AND gate and a first output connected to said second input of said first AND gate, said first bistable multivibrator having a second input and a second output, an OR gate having first, second and third inputs and having an output connected to said second input of said first multivibrator, a first delay line section having an input connected to said output of said first AND gate and having an output, a second delay line section having an input connected to said output of said first delay line section and having an output, said second delay line section having an inherent delay, a second AND gate having first and second inputs and having an output connected to said first input of said OR gate, said first input of said second AND gate being connected to said output of said first delay line section, a third AND gate having first, second and third inputs and having an output connected to said second input of said OR gate, said first input of said third AND gate being connected to the output of said second delay line section, a fourth AND gate having first, second, third and fourth inputs and having an output connected to said third input of said OR gate, said first input of said fourth AND gate being connected to the output of said second delay line section, said second input of said fourth AND gate being connected to said second output of said first bistable multivibrator, a source of a signal to utilize said second delay line section, said source being connected to said second input of said second AND gate and adapted to inhibit said second AND gate whenever said utilization signal is present, said utilization signal source being connected to said second input of said third AND gate and adapted to inhibit said third AND gate whenever said utilization signal is absent, said utilization signal source being connected to said third input of said fourth AND gate and adapted to inhibit said fourth AND gate whenever said utilization signal is present, a first differentiating circuit having an input connected to said utilization signal source and having an output, said first differentiating circuit being arranged and adapted to differentiate the leading edge of said utilization signal, a monostable multivibrator having a trigger input connected to said output of said first differentiating circuit and having an output connected to said third input of said third AND gate, said monostable multivibrator being arranged and adapted to inhibit said third AND gate after the leading edge of said utilization signal for a period equal to said inherent delay of said second delay line section, a second differentiating circuit having an input connected to said utilization signal source and having an output, said second differentiating circuit being arranged and adapted to differentiate the trailing edge of said utilization signal, and a second bistable multivibrator having a first input connected to said output of said second differentiating circuit, a second input connected to said output of said first delay line section, and an output connected to said fourth input of said fourth AND gate, said second bistable multivibrator being arranged and adapted to inhibit said fourth AND gate after a pulse issues from said first delay line section until the trailing edge of said utilization signal.

References Cited

UNITED STATES PATENTS

| | | | |
|---|---|---|---|
| 2,851,596 | 9/1958 | Hilton | 328—41 X |
| 2,961,535 | 11/1960 | Lanning | 328—55 |
| 3,150,324 | 9/1964 | Hallden et al. | 328—56 |

JOHN S. HEYMAN, *Primary Examiner.*